US012591320B2

(12) United States Patent
Bruwer et al.

(10) Patent No.: US 12,591,320 B2
(45) Date of Patent: Mar. 31, 2026

(54) TRACK PAD WITH FORCE SENSING AND HAPTIC FEATURES

(71) Applicant: AZOTEQ HOLDINGS LIMITED, Nicosia (CY)

(72) Inventors: Frederick Johannes Bruwer, Paarl (ZA); Dieter Sydney-Charles Mellet, Paarl (ZA)

(73) Assignee: AZOTEQ HOLDINGS LIMITED, Nicosia (CY)

( * ) Notice: Subject to any disclaimer, the term of this patent is extended or adjusted under 35 U.S.C. 154(b) by 0 days.

(21) Appl. No.: 18/599,427

(22) Filed: Mar. 8, 2024

(65) Prior Publication Data

US 2024/0302910 A1     Sep. 12, 2024

(30) Foreign Application Priority Data

| Mar. 9, 2023 | (ZA) | ................................. | 2023/03435 |
| Jun. 7, 2023 | (ZA) | ................................. | 2023/06019 |
| Jan. 12, 2024 | (ZA) | ................................. | 2024/00422 |

(51) Int. Cl.
| *G06F 3/0354* | (2013.01) |
| *G06F 3/01* | (2006.01) |
| *G06F 3/041* | (2006.01) |
| *G06F 3/044* | (2006.01) |

(52) U.S. Cl.
CPC .......... *G06F 3/03547* (2013.01); *G06F 3/016* (2013.01); *G06F 3/04182* (2019.05); *G06F 3/0447* (2019.05)

(58) Field of Classification Search
CPC .. G06F 3/03547; G06F 3/016; G06F 3/04182; G06F 3/0447; G06F 3/04142; G06F 3/0418; G06F 2203/04106; G06F 3/044
See application file for complete search history.

(56) References Cited

U.S. PATENT DOCUMENTS

| 6,118,435 A * | 9/2000 | Fujita | ...................... G06F 3/016 |
| | | | 345/173 |
| 7,428,142 B1 * | 9/2008 | Ligtenberg | ............ G06F 1/3203 |
| | | | 345/157 |
| 7,499,040 B2 * | 3/2009 | Zadesky | ............... G06F 3/0338 |
| | | | 345/173 |
| 8,599,142 B2 * | 12/2013 | Prados | .................... G06F 3/016 |
| | | | 345/173 |
| 9,218,073 B1 * | 12/2015 | Kremin | ................. G06F 3/0442 |
| 9,349,552 B2 * | 5/2016 | Huska | .................... H01H 13/85 |
| 9,952,705 B2 * | 4/2018 | Kono | ...................... G06F 3/016 |
| 10,585,481 B2 | 3/2020 | Czelnik et al. | |
| 10,671,189 B2 | 6/2020 | Costante et al. | |
| 11,263,421 B2 | 3/2022 | Liu | |
| 11,604,531 B2 * | 3/2023 | Wang | .................... G06F 3/0414 |
| 12,032,771 B1 * | 7/2024 | Bertrand | ............ G06F 3/04166 |

(Continued)

*Primary Examiner* — Benyam Ketema
(74) *Attorney, Agent, or Firm* — Mattingly & Malur, PC

(57) ABSTRACT

A capacitive track pad using force sensing to determine the approximate position of touch on the track pad and to use this position as a check against a capacitive touch determined position in order to disqualify potential noise generated signals. The position resolved from the inductive force sensing measurements can also be used to assist in generating a uniform haptic experience for the user. The force sensing measurements are also used to determine if the threshold for a "click" has been met.

22 Claims, 7 Drawing Sheets

Track pad stack up for force sensing

(56)                References Cited

U.S. PATENT DOCUMENTS

| | | | | |
|---|---|---|---|---|
| 12,111,988 | B1* | 10/2024 | Searle | H01H 13/83 |
| 12,379,805 | B2* | 8/2025 | Bertrand | G06F 3/0443 |
| 2002/0149561 | A1* | 10/2002 | Fukumoto | G06F 3/04886 |
| | | | | 345/156 |
| 2002/0149571 | A1* | 10/2002 | Roberts | G06F 3/04142 |
| | | | | 345/173 |
| 2003/0210235 | A1* | 11/2003 | Roberts | G06F 3/0414 |
| | | | | 345/173 |
| 2003/0214485 | A1* | 11/2003 | Roberts | G06F 3/0418 |
| | | | | 345/173 |
| 2004/0125086 | A1* | 7/2004 | Hagermoser | G06F 3/04142 |
| | | | | 345/173 |
| 2004/0263483 | A1* | 12/2004 | Aufderheide | G06F 3/041 |
| | | | | 345/173 |
| 2005/0052425 | A1* | 3/2005 | Zadesky | G06F 3/03547 |
| | | | | 345/173 |
| 2009/0016003 | A1* | 1/2009 | Ligtenberg | G06F 1/1616 |
| | | | | 361/679.26 |
| 2009/0184921 | A1* | 7/2009 | Scott | G06F 1/1626 |
| | | | | 345/156 |
| 2010/0103640 | A1* | 4/2010 | Brown | G06F 3/04142 |
| | | | | 361/829 |
| 2010/0127140 | A1* | 5/2010 | Smith | G06F 3/0414 |
| | | | | 248/220.1 |
| 2010/0156814 | A1* | 6/2010 | Weber | G06F 3/016 |
| | | | | 345/173 |
| 2011/0141052 | A1* | 6/2011 | Bernstein | G06F 3/041 |
| | | | | 341/5 |
| 2011/0187667 | A1* | 8/2011 | Kaida | G06F 3/016 |
| | | | | 345/173 |
| 2013/0207928 | A1* | 8/2013 | Takata | G06F 3/03547 |
| | | | | 345/174 |
| 2014/0098030 | A1* | 4/2014 | Tang | G06F 3/04142 |
| | | | | 345/173 |
| 2015/0130730 | A1* | 5/2015 | Harley | G06F 3/016 |
| | | | | 345/173 |
| 2015/0370376 | A1* | 12/2015 | Harley | G06F 3/0447 |
| | | | | 345/174 |
| 2016/0048256 | A1* | 2/2016 | Day | G06F 3/0416 |
| | | | | 345/174 |
| 2016/0103544 | A1* | 4/2016 | Filiz | G06F 3/0412 |
| | | | | 345/174 |
| 2016/0129483 | A1* | 5/2016 | Sung | B08B 1/10 |
| | | | | 15/97.1 |
| 2016/0378255 | A1* | 12/2016 | Butler | G06F 3/0346 |
| | | | | 345/174 |
| 2018/0052350 | A1* | 2/2018 | Zhao | G06F 3/0412 |
| 2018/0218859 | A1* | 8/2018 | Ligtenberg | G06F 1/165 |
| 2019/0004661 | A1* | 1/2019 | Lee | G01R 31/2891 |
| 2019/0286871 | A1* | 9/2019 | Song | G06F 3/0428 |
| 2020/0150828 | A1* | 5/2020 | Kim | G06F 3/04842 |
| 2020/0400513 | A1* | 12/2020 | Jung | H03K 17/967 |
| 2022/0050546 | A1* | 2/2022 | Hong | G06F 3/04182 |
| 2022/0206602 | A1* | 6/2022 | Jung | G06F 3/04883 |
| 2023/0005352 | A1* | 1/2023 | Wang | G06F 3/016 |
| 2023/0110133 | A1* | 4/2023 | Dhar | G06F 3/045 |
| | | | | 345/173 |
| 2024/0302910 | A1* | 9/2024 | Bruwer | G06F 3/04182 |
| 2025/0028411 | A1* | 1/2025 | Monson | G06F 3/044 |

* cited by examiner

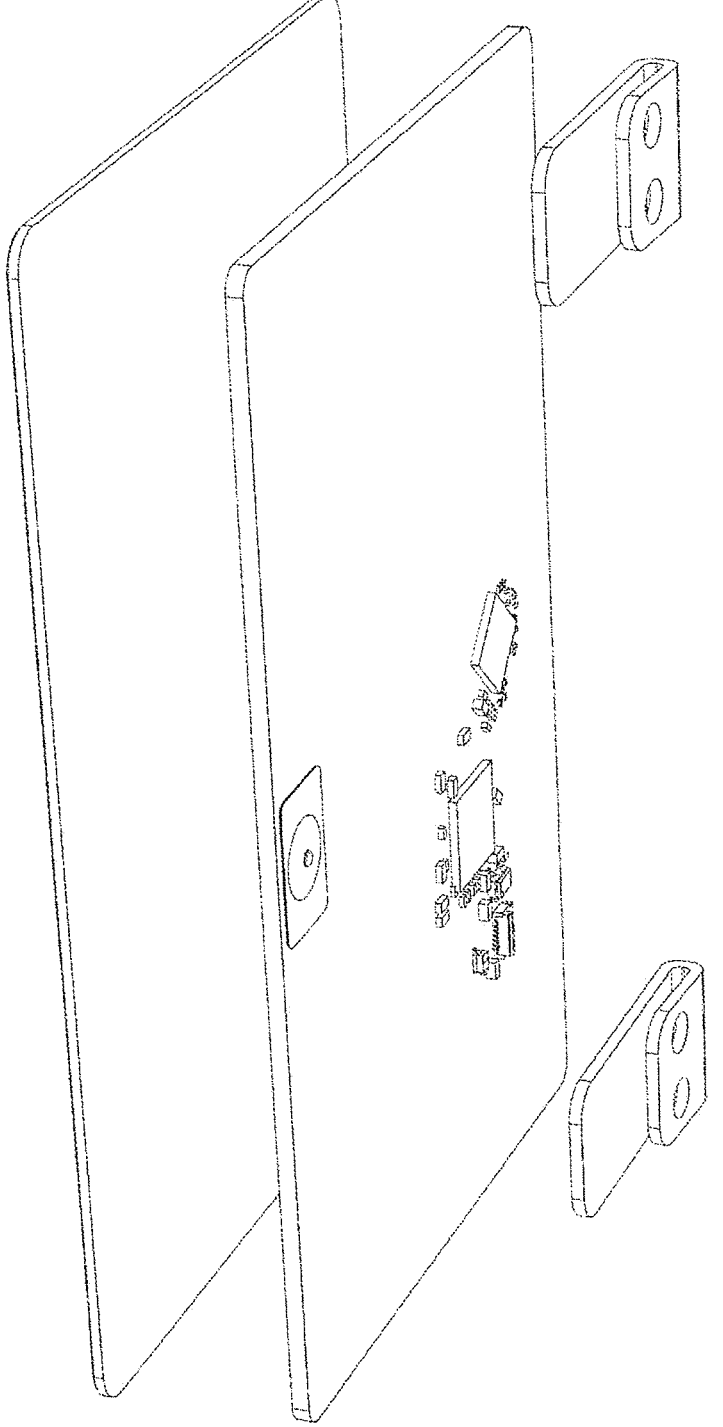
Fig. 1 – Simple Click Track Pad

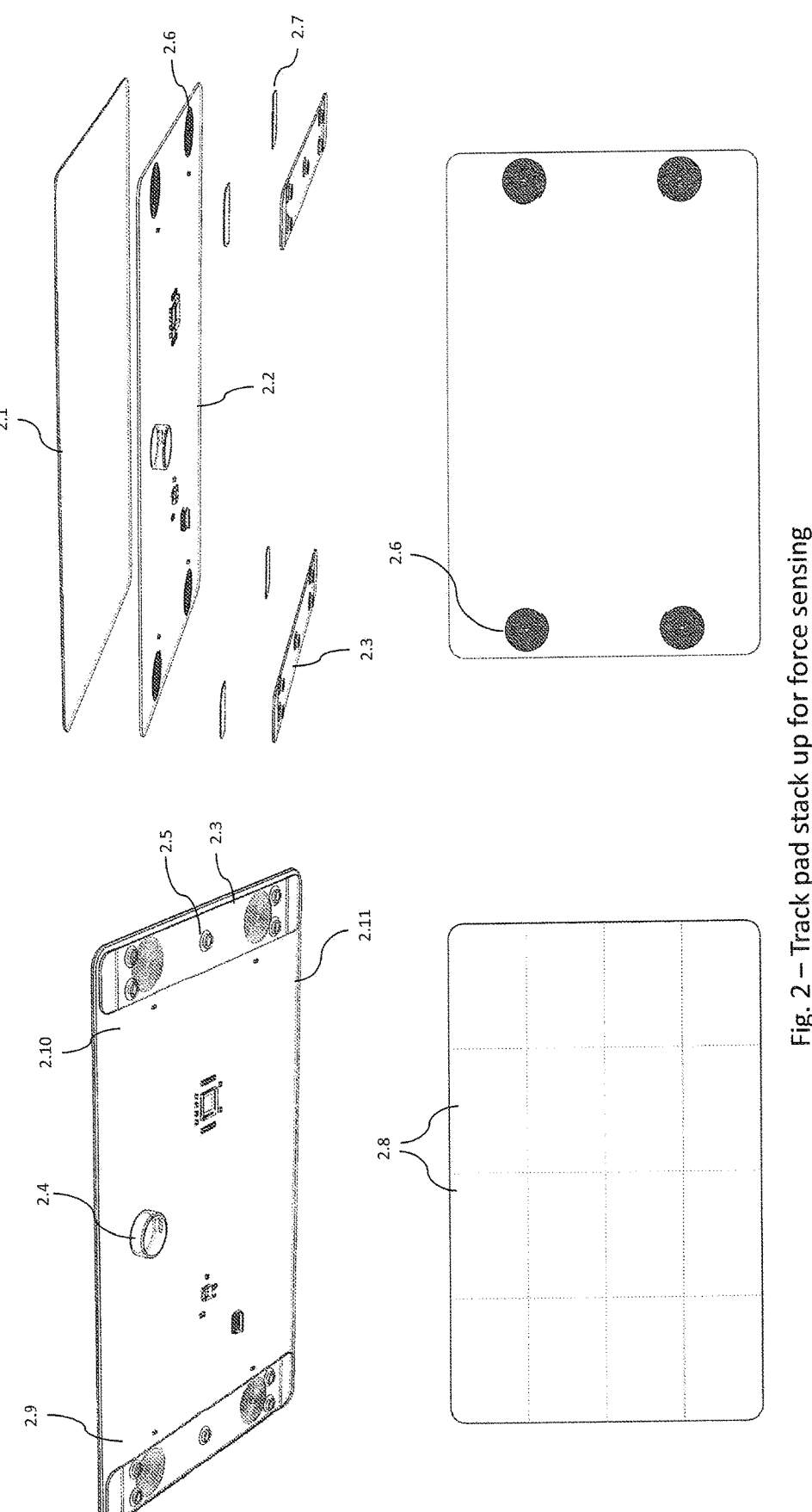
Fig. 2 – Track pad stack up for force sensing

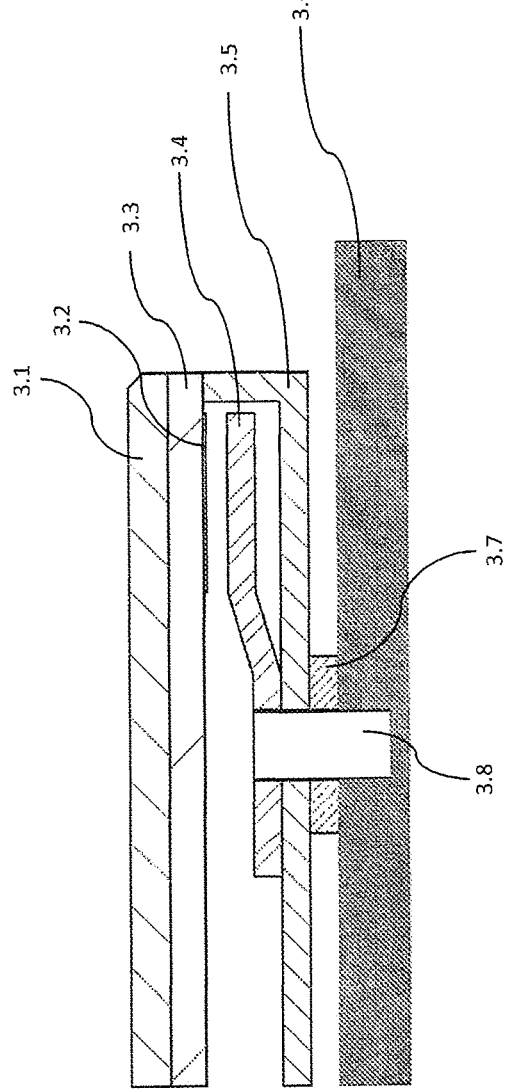
Fig. 3 – Inductive force sensing construction

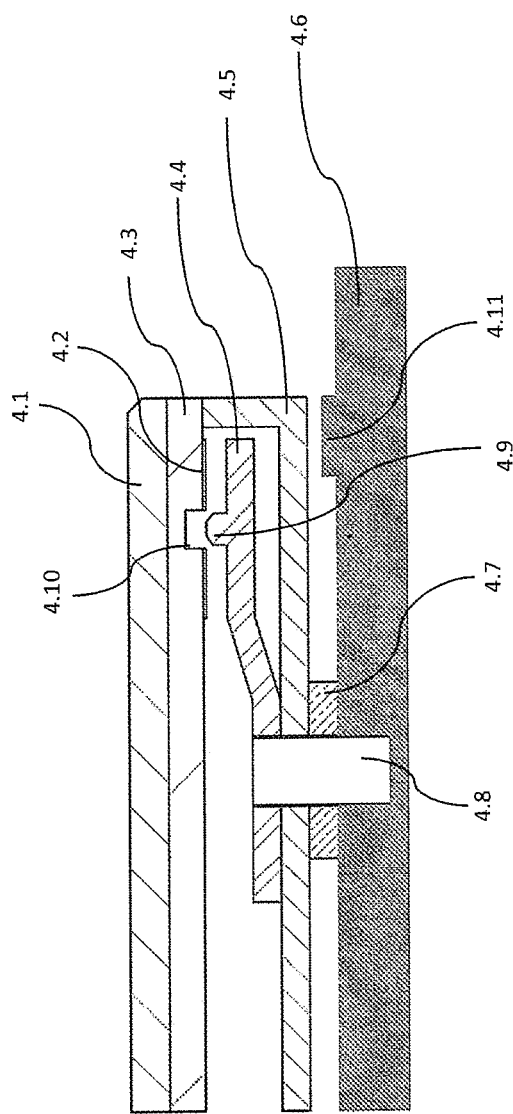
Fig. 4 Inductive force sensing construction with metal/ferrite object ingress into coil

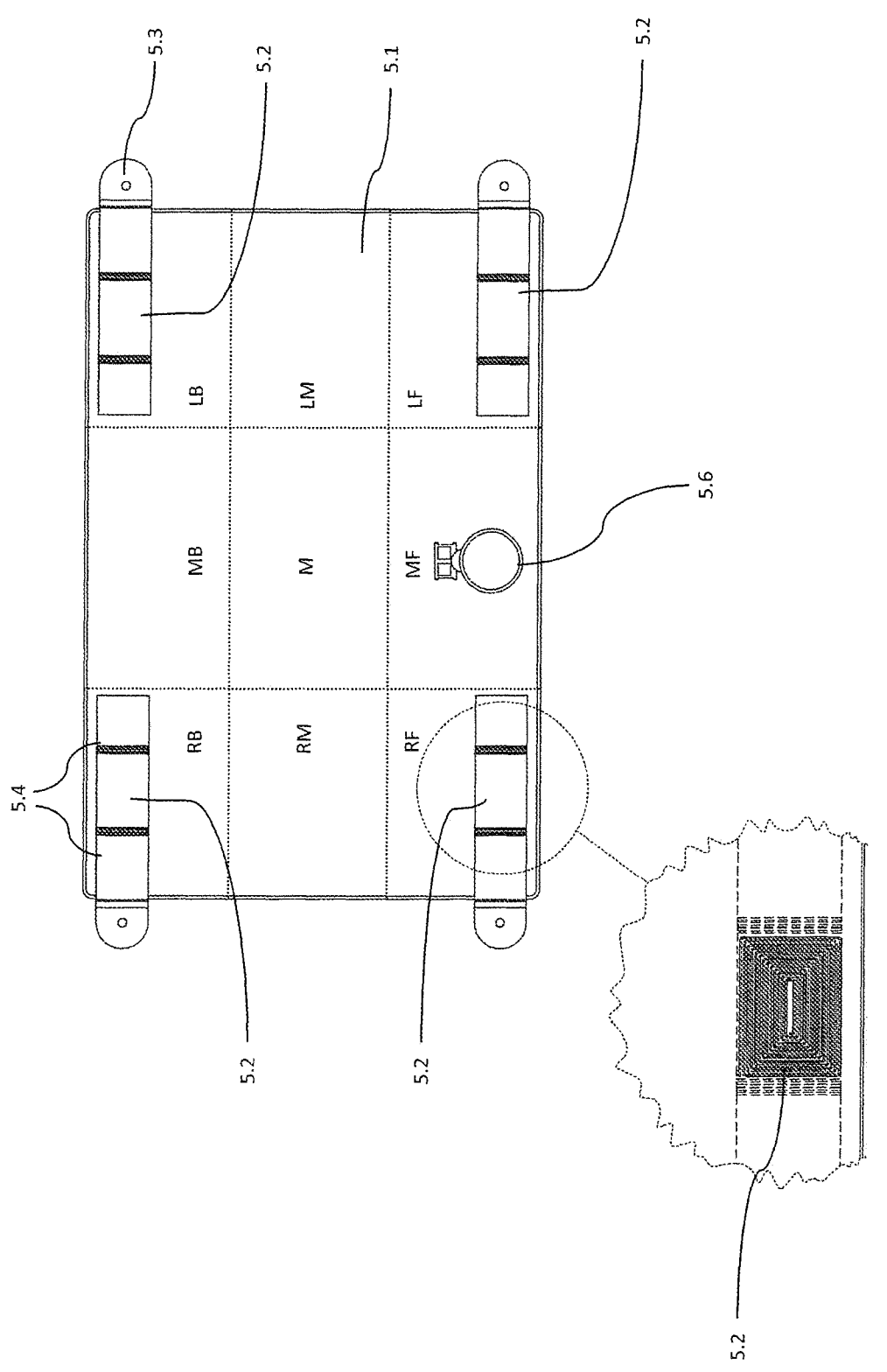
Fig 5: Bottom view: Force sensing brackets

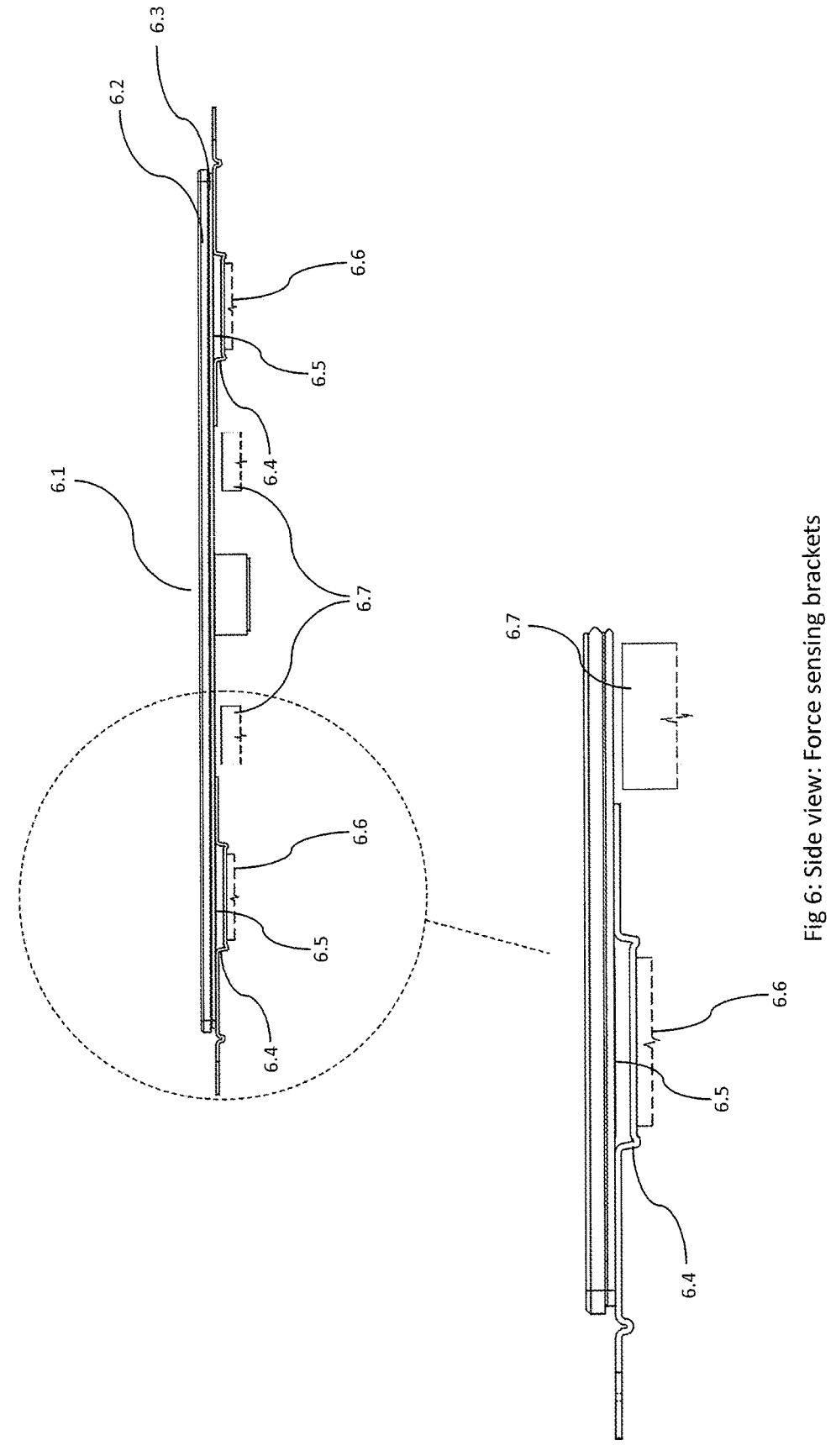
Fig 6: Side view: Force sensing brackets

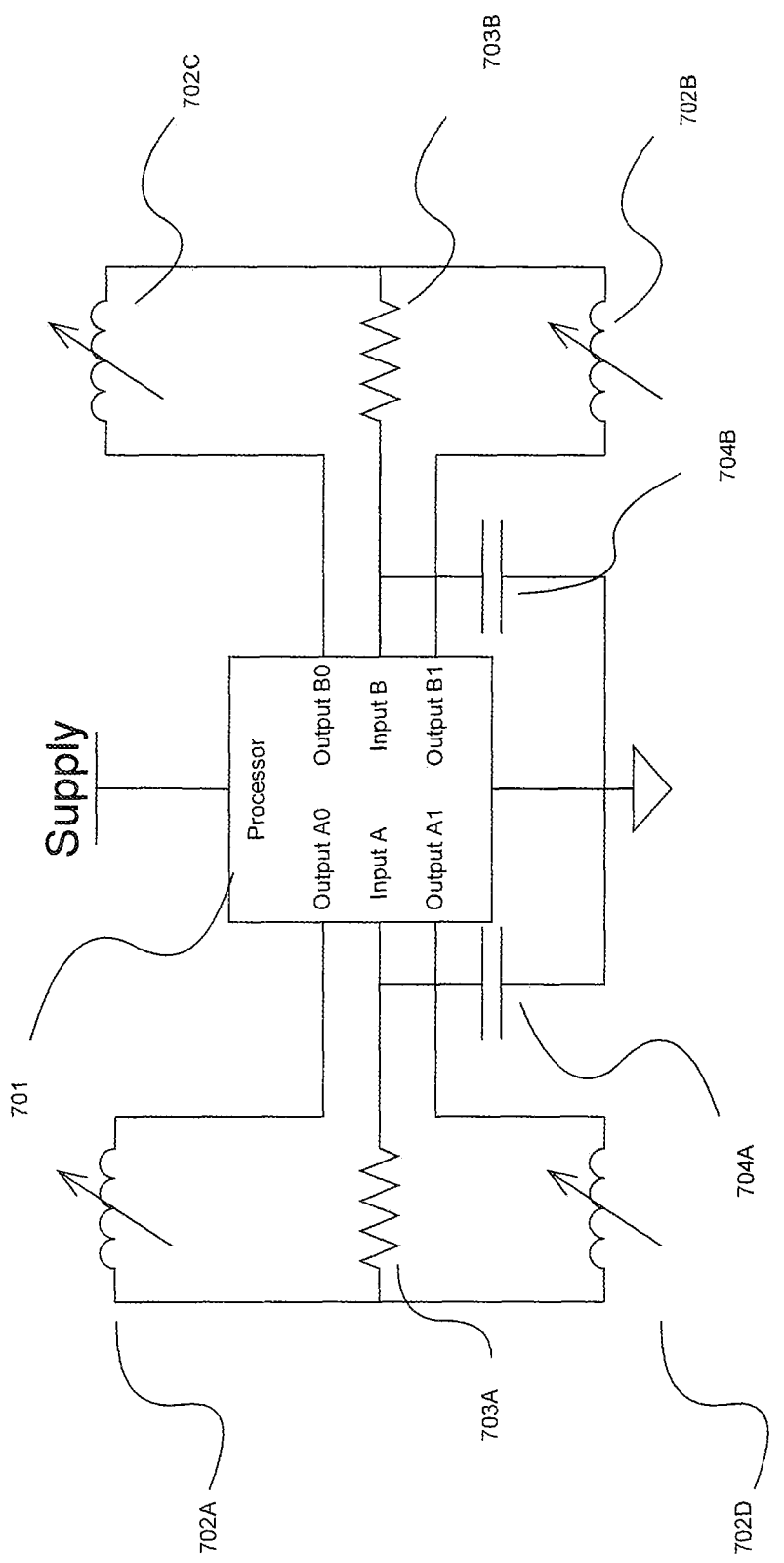
Figure 7 - Measurement circuit connections to the inductors.

TRACK PAD WITH FORCE SENSING AND HAPTIC FEATURES

CROSS-REFERENCE TO RELATED APPLICATION

The present application claims priority from South Africa applications ZA 2023/03435, filed Mar. 9, 2023, ZA 2023/06019, filed Jun. 7, 2023, and ZA 2024/00422, filed Jan. 12, 2024, the contents of which are hereby incorporated by reference into this application.

Background

Track pads are widely used in computers, vehicles and other applications of user interface functions. The state of the art features capacitive sensing for tracking. A single dome switch (or other type of electromechanical switch) in combination with the capacitive sensing is sometimes used for selective switches (left, right). Multiple switches are also used, or force from a user finger is measured using capacitive methods or strain gauges. When force sensing is used the system typically features haptic feedback to the user to create a tactile feeling.

Electromechanical switches have a single non-adjustable "click" point which is subject to wear and degradation and importantly requires movement that creates openings for fluids or dirt to enter. These factors can all be seen as drawbacks.

The haptics feedback has traditionally been expensive so that, often, there is only a limited number in use per product.

SUMMARY OF THE INVENTION

It is an object of the invention to enable a reliable and cost effective force sensing implementation method for a track pad with adjustable sensing levels for "click" activation and good haptics using a minimum number of haptic engines. Furthermore, the force sensing can be used as a touch pad redundancy check to prevent false or spurious touch events from entering the system due to rf or other electromagnetic noise.

A main target application for this invention is capacitive track pads as are for example found in laptop and notebook computers, but also for other track pads and touchscreens. For any of these track pads it is proposed to use inductive force sensing to determine the level of user exerted pressure onto the track pad and also to determine the location of where the pressure is applied.

In this specification unless the context clearly indicates otherwise "pressure" and "force" are used interchangeably.

In an embodiment of the invention the force sensing is performed on a track pad comprising a bracket that bends under pressure and is constructed in a way that changes proximity between an inductive coil(s) and a metal or ferrite object(s). The resulting change in distance between the inductor and an interfering member is reflected in a change in inductance which in turn is directly related to the pressure applied on the track pad.

In a specific exemplary embodiment the track pad is only supported in four corners by bracket structures with inductive force sensing features. If a user presses right on top of a support structure, then the force is sensed predominantly (or depending on the construction—exclusively) in an attached single force sensing structure. If the user presses right in the center between all the force sensing support structures, then the force sensors (if correctly calibrated) reflect equal or very similar measurements.

Force sensing through e.g. strain gauges is known in the art. Inductive measurements techniques are known in the art, whereas this invention is about using inductive force sensors in a capacitive track pad system to implement certain functions/features and especially the means of creating changes in the inductance that can be measured and are related to pressures and displacements experienced on the track pad.

In an embodiment of this invention the detection of force applied to the track pad (for example by a user finger) is used to support the authenticity of the capacitive touch sensor system. If an electromechanical switch is used for the track pad "click", this redundancy function is not possible. The switch only provides information if the pressure is high enough to activate the switch and normal track pad operation is performed at a much lower level of pressure. In accordance with this invention if, for example, the capacitive sensor system detects signals on the track pad but no pressure is measured by the force sensing system, the capacitive signals may be rejected.

In an embodiment of this invention the relative force between four force sensing measurements made at the four corners of a track pad is used to make a determination of the position of the pressure point. This position is then correlated with the position determined by the capacitive touch sensing system. This can be used to achieve a higher level of confidence in the capacitive sensing operation. For example, if icons are selected on the screen, the spurious selection of some functions may be problematic. Capacitive sensing track pads have been known to be influenced by liquids, radio frequency interference or other electromagnetic noise and also liquids on the touch surface. If, for example, the capacitive sensor measures a completely false event it is highly unlikely that the force sensor will reflect a corresponding event. The force measurement and the position derived from the force sensor measurements can be used to support and, in a sense, to verify the capacitive sensing track pad results.

The positional verification or redundancy may also apply to a line being drawn on the track pad. As the line moves from the left front to, for example, the right back of the track pad, the position derived from the force sensors measurements must correlate.

In a further embodiment the post decision information of the capacitive and force sensors is used to train and/or fine tune the algorithms in either sensor system. This is especially helpful over time if some of the mechanical parameters change due to, for example, wear and tear. Using AI techniques and adaptive software these changes can be tracked and compensated for.

In an embodiment of the invention the force sensing system may be used to make a decision about the equivalent of a user pressing a tactile switch such as found in "single click" and "click anywhere" capacitive track pads. The decision for a "click" according to this invention is made on a pressure metric even though a very small displacement is required. This means at a certain pressure the force sensor system makes a decision that the equivalent of a switch activation "click" occurred, for example, the left or right bottom of the track pad. The force sensor alone makes the pressure decision, but the left, right or other position can be decided by the capacitive touch system or the force sensing system.

The position of the press on the track pad, typically by the user finger, can also be used to influence the haptics to balance the haptics sensation or tactile feedback at the position of pressure. For example, if a single haptics stimulator is used and is positioned in the middle and front of the track pad then a press on the middle front of the track pad may require the haptic stimulator (e.g. LRA) to be driven at a much reduced level. A press right or left front may require a somewhat reduced driving level whereas a press at the right or left back of the track pad may require a maximum driving force to the haptic stimulator. The same technique applies to balancing the perceived effect from multiple haptic stimulators by using the derived press position information.

In terms of deciding when the equivalent of a switch activation (a click) has occurred, the levels of force or pressure required may be adjusted, for example, in the left front sensor or may be dependent on the combined readings from multiple sensors.

For example, if the user presses right in the far left front corner, the left front inductive sensor should reflect almost all the reading of the force exerted on the track pad. If the user presses between the left front corner and front middle then the force readings will be in a ratio between the two front corner sensors. This means if the decision for a "click" is only dependent on the reading from a single sensor, that more pressure may be required if the press is not right in the corner.

Therefore, if a consistent pressure is required for making a click decision, the readings from all the force sensors (four corners) need to be incorporated in making the decision. A different configuration and/or number of force sensors may be used. For example, 3 sensors are needed for triangulation. A fifth sensor in the middle may help for accuracy and support but may be difficult to implement for something like a touch screen and in fact the method may be extended to any number of force sensors although the software complexity increases.

It is also proposed that haptic feedback (a tactile or click feel) is provided when the pressure is sufficient to activate the click decision and again when the pressure is released. This may be during a short press where it would be experienced as a single haptics click or it may be a period of time during which the user presses and maintains the pressure for an extended period before releasing. The signals provided to a Linear Resonant Actuator (LRA) motor or other actuator may be different between the two signals for engaging and disengaging.

The bracket(s) holding the track pad in position and as such the stack up of the system can be very simple to save cost and reduce thickness. The same bracket(s) can be used for force sensing and for mounting the track pad into a notebook or laptop computer.

The technique of using the inductive force sensing measurement to determine a user click that is reported through haptic means can also be extended to obtain further flexibility and advantages such as:

When two or more finger gestures are used, there is automatically more pressure onto the track pad from the user and in accordance with this invention the pressure trigger level for deciding that a click has happened or must happen, can be increased when two or more fingers are recognized as being in touch with the track pad. This will reduce the chance of accidental click decisions during multi-finger gestures, such as pinch or zoom. Similarly for gestures like drag or swipe the required level for deciding a click has happened can be increased or the click can be blocked during this time.

The use of tap gestures can also be reported using haptics.

The use of haptics to report two finger or side bar scrolling may also be implemented. This means for example when two fingers are used to scroll up/down in a document, such scrolling and scrolling speed may be announced using haptics similarly to what would have happened when scrolling with a computer mouse. The same may be applied when a side bar or top bar is used to scroll up and down or sideways.

Similar to standard palm rejection, the force sensing/haptics may be deactivated for abnormal detections.

The force sensing may be calibrated during production, but it is also possible to recalibrate after a period of use by indication positions where the user must press and then correlate that information with the measurements of the four sensors. As such the system may activate a re-calibration procedure or may suggest this to the user after a period of time, or if it is determined that a drastic event happened, such a heavy object dropping onto the track pad. The correlation with the capacitive touch information can also be used at times or continuously to calibrate the force sensing system.

The inductive sensing system of the track pad can also be used to monitor the lid closure of a product such as a laptop or notebook computer.

In accordance with this invention the force sensing can be used to assist with "palm rejection" functionality. This is done when a touch is sensed with capacitive sensing on the track pad but the force seems excessive for a single finger.

In a further embodiment the track pad inductive sensing system may be a multi-sensor system that can also monitor the ambient light and assist with activating or deactivating key board backlighting.

It is also proposed that another novel construction method can be used where the bracket is only used to apply the reverse force against the force applied by the user, i.e. the bracket determines the displacement of the track pad in relation to the force applied by the user. For example, 10 Newton must result in ~10 µm or 50 Newton must move the track pad ~50 µm if the pressure is applied right above a bracket support structure. If the pressure is applied at the center of the track pad the pressure will be divided between the various support structures and there will be less movement on each individual sensing structure. The inductive sensor structure comprises at least an inductor e.g. a coil connected to an integrated circuit, for example, the track pad pcb. The said construction includes a conducting or ferrite member. The said conducting or ferrite member is oriented such that it penetrates into the core (or the reverse when pressure is released) of the inductor as the track pad moves under the user applied pressure and in this way affects the inductance of the coil.

In this construction the bracket is not part of what affects/changes the inductance in relation to the movement.

In this specification a "click" is an event where a user presses sufficiently hard on a track pad, for example left front, to active a switch in order to make a selection. This is used per state of the art in laptops etc.

The signals which are produced by the sensors, in each embodiment, are fed to a suitable processor which by using an appropriate algorithm, as is known in the art, calculates the force level on the track pad, the pressure period, decides on a "click", and does such comparisons and evaluations as may be required. These aspects lie within the scope of one skilled in the art. As indicated an important inventive step, provided herein, is a means of creating measurable inductance changes which are related to pressures and displacements on a capacitive track pad.

BRIEF DESCRIPTION OF THE DIAGRAMS

FIG. 1—Simple click track pad, this is a state of the art track pad making use of a single electromechanical switch to determine left/right front clicks made by the user.

The invention is further described with reference to the following drawings:

FIG. 2—Track pad stack up for force sensing, this describe an embodiment of this invention with a force sensing structure as well as a haptic LRA positioned on front part of track pad.

FIG. 3—Inductive force sensing construction, an example of an inductive force sensing construction in a track pad application.

FIG. 4—Force sensing bracket construction with coil penetration

FIG. 5—Bottom view: Track pad, brackets , haptic actuator and layout.

FIG. 6—Side view: Track pad, brackets and stops

FIG. 7—Circuit diagram showing a measurement circuit (processor) connected to the inductors.

DETAILED DESCRIPTION OF THE INVENTION

The following description of the appended drawings is presented merely to clarify the spirit and scope of the present invention, and not to limit such scope. These are merely embodiments in example applications, and a large number of alternatives or equivalent embodiments and applications may exist which will still fall within the scope of the claims for the present invention.

In FIG. 2 an embodiment of the invention is described with reference to a capacitive track pad comprising four inductive force sensors and an LRA (Linear Resonant Actuator) haptic actuator. An overlay such as glass or Mylar 2.1 is positioned on top of a pcb 2.1A with capacitive sensing electrode patterns 2.2. A bracket 2.3 is used for mounting the track pad at fastening points 2.5 to a product such as a laptop computer (not shown).

In this embodiment a compressible film or strip 2.7 is used to create a space between the pcb and each coil (inductor) 2.6 and the bracket 2.3. As pressure is applied to the track pad (e.g. user digit) the film 2.7 is compressed, the coil 2.6 moves closer to the metal of the bracket 2.3. This change in proximity results in a change in the inductance of the coil 2.6. The change in inductance is a metric of the displacement resulting from the pressure. As such the change in pressure is reflected and measured through the change in inductance of coils like 2.6. In another embodiment the strip 2.7 is solid (non-compressible) but the bracket bends under force to allow variance in the distance between the coils 2.6 and the metal bracket 2.3. In both cases the bracket 2.3 acts as an interfering member that affects the inductance of the coils 2.6 in a way that allows the inductive measurements to give a metric related to the force applied to each sensor.

The haptics actuator (LRA) 2.4 in this example is positioned in the middle and front part of the track pad 2.2. A pressure exerted at left front 2.9 or right front 2.10 is a shorter distance from the LRA 2.4 than for example a pressure point at the right back 2.11.

In an embodiment of this invention the inductive sensing information from the four sensors placed at the four corners of the track pad is used to resolve the position of a single point of pressure on the track pad. In an application where it is desirable for the user to experience (through user finger) a uniform or equal haptic force or tactile feedback irrespective of the pressure point, the resolved position can be used to calculate the distance between the LRA 2.4 and the pressure point. The driving force of the haptic actuator can be adjusted accordingly to balance out the degradation of haptics force over distance. E.g. if the pressure point is on top of the LRA 2.4 the driving force is lowest and if the pressure point is far right back corner, the driving force is highest. If the adjustments for haptic energy dissipation over distance are correctly programmed and calibration is done well, a single haptic actuator or multiple haptic generators not equally spread out across the trackpad, can be used to present a more uniform user sensation anywhere on the track pad.

In another embodiment of the invention the pressure exerted by the user on the track pad and measured through the force sensing system is used to gate capacitive touch sensing events. If, for example, no pressure is measured then a low probability can be put on a touch sensing event. In this context the force sensing (or lack thereof) can vet or disqualify a touch sensing event.

In another embodiment of the invention the position of a single pressure point on the track pad can be resolved using the combined force sensing measurements and can be mapped into a grid 2.8 on the track pad. This position can be used as a redundant measurement to check the capacitive touch position against. If the two metrics differ substantially, decisions can be made in terms of rejecting data, re-doing the measurements etc. In essence the force sensing data can be used to augment or improve the capacitive touch data. This may be especially important for critical functions selected through a track pad user interface in applications such as in automotive or medical apparatus.

It is possible to make decisions such as, for example, swipe gestures or segment selections (such as a numeric pad) based on the force sensing data alone, i.e. capacitive sensing data is not required.

In FIG. 3 another example construction of an inductive track pad force sensing stack up is shown. The overlay 3.1 is attached to the capacitive track pad pcb 3.3 with the inductive coil 3.2 flatly routed on the pcb 3.3. A mechanical bracket 3.5 similar to 2.3 is constructed in a part that moves under pressure and a part 3.4 not subject to the pressure exerted on the track pad by a user. The bracket is positioned on top of a spacer and fastened to the chassis of the laptop or other product housing 3.6 at fastening points 3.8.

When pressure is exerted on the track pad overlay 3.1 for example above the inductive coil 3.2 the part of the bracket 3.5 supporting the track pad bends towards the housing. The thickness of the spacer determines a bracket maximum displacement. Blocks or spacers may be used to further restrict the maximum bend. As bracket 3.5 bends towards the chassis 3.6 the distance between the coil 3.2 and the metal bracket part 3.4 reduces. This change in proximity results in a change in inductance of the coil 3.2. The pressure exerted results in a related change of inductance that is measured.

As per FIG. 4, other constructions are possible with an interfering metal or ferrite piece 4.9 positioned on a non-moving bracket part 4.4 or attached to the product chassis (4.6 of a part 4.8) to move into a hole 4.10 in the center/core of a flat coil inductor 4.2 when pressure is exerted onto the track pad top layer 4.1 by the user.

FIG. 5 shows a track pad unit 5.1 with various features in accordance with this invention. The track pad (overlay and pcb) is divided into regions left (L), middle (M) and right (R), front (F), middle (M) and back (B). There are four brackets (5.2). These can also be designed to be part of a single structure.

Each bracket is attached to the pcb (5.4) and has a section that is adjacent but removed from an inductive coil on the pcb. The part 5.3 of the bracket, that is used to mount the track pad inside the product, can vary from product to product.

It is beneficial for the haptics to mount the track pad in a floating manner to better transfer the energy from the haptic actuator to the user. As such a shock absorbing mechanism between the bracket part 5.3 and the product, for example, a laptop chassis may be beneficial.

In accordance with this invention the force sensing can determine the position of the force applied by the user onto the track pad and, based on the haptic actuator position 5.6, adjust the haptic energy to produce a similar feeling across the whole track pad. For example. when the user press is right above the actuator 5.6, the haptic energy is lowest. The energy can be adjusted per region or to be stronger when the distance between the haptic actuator and position of touch is greater. This will compensate for the loss of haptic energy over distance. In this example when the user press is in LB or RB the actuator will be driven at its highest energy level.

This concept is clearly linked to where the haptic actuator or actuators is/are positioned.

In FIG. 6 more detail is given for an exemplary inductive force sensing bracket that can be positioned at the corners of the track pad 6.1. The track pad has an overlay (glass or other layer) 6.2, and a multi-layer pcb 6.3, with for example, inductive coils 6.5 in the form of tracks on the pcb. The bracket 6.4 must be able to move closer to the coils 6.5 under force of a member 6.6. The part above the coil may be conductive metal or may be ferrite. Changing the distance between bracket 6.4 and the coil 6.5 will change the inductance measured for the coil 6.5 and in this way movement/pressure can be determined.

If the track pad is only supported in the four corners by members 6.6 then the total force applied by the user onto the track pad is the aggregate of the four inductive force sensors. And the position of a single pressure point can be derived from the ratio of pressure between the four sensors. This is similar to triangulation but with four points of reference.

The brackets are firmly attached to the pcb, for example, with double sided tape or an epoxy/glue.

In order to prevent the brackets from deforming permanently blocks or stops 6.7 can be used that will take over the force from the brackets after movement beyond a certain distance.

In FIG. 7 a measurement circuit processor 701 is shown, this is an electronic component and can be an microprocessor circuit also comprising sensor circuitry suitable to measure the inductance of the inductors 702 A,B,C,D. Said inductors are variable in relation to pressure exerted on the capacitive track pad. Resistors 703A,B are used for current limiting (if required) and capacitors 704A,B can be included for filtering of radio frequency noise.

The invention claimed is:

1. Apparatus for determining the position and level of a force exerted by a user on a capacitive sensing track pad which has four corners, the apparatus including at or near each corner a respective inductive force sensor which produces a respective signal which is dependent on the level of force measured by such sensor, and a processor, responsive to said signals, which is configured to determine said position and level of force exerted on the track pad by using the information from all the inductive force sensors, the apparatus further including at least one haptic generator responsive to said signals, whereby a driving force of the at least one haptic generator is adjusted according to said position of force to achieve a more uniform haptic sensation anywhere on the track pad, wherein the processor is configured, when said capacitive track pad measurements detect multiple contact points on the track pad, to vary the magnitude of said force level which is required for a "click" event to be recognized.

2. Apparatus according to claim 1 which includes at least one bracket to mount the track pad onto a product, said at least one bracket being firmly attached to the track pad printed circuit board and wherein each inductive force sensor includes a respective inductor which comprises tracks on said printed circuit board and wherein force on the track pad produces a change in inductance in the inductor which is due only to at least one of the following:

the material from which said at least one bracket is made, and a change in the shape or deformation of said at least one bracket.

3. Apparatus according to claim 1 wherein the processor is configured to use the force sensing information to improve "palm rejection" performance.

4. Apparatus according to claim 1 wherein at least one of the inductive force sensors is used to monitor lid closure of a product such as a laptop or notebook computer.

5. Apparatus according to claim 1 wherein the processor is configured to detect gestures using said signals which are dependent on the level of force measured by the sensors without using capacitive sensing information.

6. Apparatus according to claim 1 wherein the processor is configured to use adaptive software to automatically calibrate for mechanical variations that happen over time, said calibrations based on correlation between force level measurements and capacitive track pad measurements.

7. Apparatus according to claim 1 wherein the processor is configured to use artificial intelligence to automatically calibrate for mechanical variations that happen over time, said calibrations based on correlation between the force measurement information and capacitive track pad measurement information.

8. Apparatus for determining the position and level of a force exerted by a user on a capacitive sensing track pad which has four corners, the apparatus including at or near each corner a respective inductive force sensor which produces a respective signal which is dependent on the level of force measured by such sensor, and a processor, responsive to said signals, which is configured to determine said position and level of force exerted on the track pad by using the information from all the inductive force sensors, the apparatus further including at least one haptic generator responsive to said signals, whereby a driving force of the at least one haptic generator is adjusted according to said position of force to achieve a more uniform haptic sensation anywhere on the track pad, wherein each inductive force sensor comprises an inductor with a core and an interfering member which is movable into the core, in response to force applied to the track pad, in order to affect the inductance of the inductor.

9. Apparatus according to claim 8 which includes a bracket to mount the track pad onto a product, said at least one bracket being firmly attached to the track pad printed circuit board and wherein each inductive force sensor includes a respective inductor which comprises tracks on said printed circuit board and wherein force on the track pad produces a change in inductance in the inductor which is due only to at least one of the following:

the material from which the at least one bracket is made, and a change in the shape or deformation of the at least one bracket.

10. Apparatus according to claim 8 wherein the processor is configured to use the force sensing information to improve "palm rejection" performance.

11. Apparatus according to claim 8 wherein at least one of the inductive force sensors is used to monitor lid closure of a product such as a laptop or notebook computer.

12. Apparatus according to claim 8 wherein the processor is configured to detect gestures using said signals which are dependent on the level of force measured by the sensors without using capacitive sensing information.

13. Apparatus according to claim 8 wherein the processor is configured to use adaptive software to automatically calibrate for mechanical variations that happen over time, said calibrations based on correlation between force level measurements and capacitive track pad measurements.

14. Apparatus according to claim 8 wherein the processor is configured to use artificial intelligence to automatically calibrate for mechanical variations that happen over time, said calibrations based on correlation between the force measurement information and capacitive track pad measurement information.

15. A method of using inductive force sensors in or near at least four corners of a capacitive sensing track pad, wherein the force sensing measurements of the inductive sensors are used to resolve an approximate position and level of force exerted by a user on said track pad, the method further comprising the step of using adaptive software to automatically calibrate for mechanical variations that happen over time, said calibrations based on correlation between information relating to said force sensing measurements and information relating to capacitive track pad measurements.

16. A method in accordance with claim 15 which includes the step of using said resolved approximate position to adjust a level of a generated haptic driving force in order to achieve a more uniform haptic sensation by the user at the point of pressure across the track pad.

17. A method in accordance with claim 15 wherein each inductive force sensor respectively comprises an interfering member and an inductor and said force sensing measurement includes the step of allowing the interfering member to move into the core of the inductor thereby to affect the inductance of the inductor.

18. A method in accordance with claim 15 wherein at least one bracket is used for mounting the said track pad onto a product, said at least one bracket being firmly attached to a printed circuit board of the track pad, and wherein said inductor is formed by tracks on said printed circuit board, said change in inductance being related to a change in pressure exerted onto the said track pad and wherein said change in inductance is due only to at least one of the following:

the material from which the at least one bracket is made, and a change in the shape, or deformation of the at least one bracket.

19. A method in accordance with claim 15, further comprising the step of using force sensing information to improve palm rejection performance.

20. The method of claim 15 wherein the adaptive software uses artificial intelligence for calibration.

21. The method of claim 15 which includes the step of using the force sensing measurements to monitor lid closure of a product such as a laptop or notebook computer.

22. The method of claim 15 further comprising the step of detecting gestures using said force sensing measurements, without using capacitive sensing information.

* * * * *